US008433290B2

(12) United States Patent
Tanaka

(10) Patent No.: US 8,433,290 B2
(45) Date of Patent: Apr. 30, 2013

(54) MOBILE COMMUNICATION DEVICE CAPABLE OF FUNCTIONING IN TRANSMITTER DISABLING STATE

(75) Inventor: Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/453,017

(22) Filed: Apr. 23, 2012

(65) Prior Publication Data
US 2012/0208594 A1 Aug. 16, 2012

Related U.S. Application Data

(63) Continuation of application No. 12/420,272, filed on Apr. 8, 2009, now Pat. No. 8,185,136.

(30) Foreign Application Priority Data

Apr. 8, 2008 (JP) ................................. 2008-100134
Apr. 9, 2008 (JP) ................................. 2008-101098

(51) Int. Cl.
H04M 1/66 (2006.01)
(52) U.S. Cl.
USPC ............ 455/411; 455/100; 455/418; 455/439
(58) Field of Classification Search .................. 455/418, 455/575, 404.1, 26.1, 436, 438, 439, 440, 455/565, 456.6, 419, 414, 550
See application file for complete search history.

(56) References Cited

U.S. PATENT DOCUMENTS

| | | | |
|---|---|---|---|
| 6,421,544 B1 * | 7/2002 | Sawada ........................ 455/565 |
| 7,013,134 B2 * | 3/2006 | Ikeda ............................ 455/419 |
| 7,039,425 B1 * | 5/2006 | Mazawa et al. ............ 455/456.4 |
| 7,856,245 B2 * | 12/2010 | Trachewsky et al. ...... 455/552.1 |
| 2002/0039896 A1 * | 4/2002 | Brown .......................... 455/419 |
| 2002/0142754 A1 * | 10/2002 | Takatori ....................... 455/411 |
| 2005/0107120 A1 * | 5/2005 | Yueh ............................ 455/557 |
| 2005/0181826 A1 * | 8/2005 | Yueh ......................... 455/556.2 |
| 2006/0046704 A1 * | 3/2006 | Hori et al. ..................... 455/418 |
| 2008/0090534 A1 * | 4/2008 | Wai ............................. 455/187.1 |
| 2009/0245549 A1 * | 10/2009 | Jubelirer et al. .............. 381/309 |

OTHER PUBLICATIONS

Tanaka; "Mobile Communication Device Capable of Functioning in Transmitter Disabling State"; U.S. Appl. No. 12/420,272, filed Apr. 8, 2009.

* cited by examiner

Primary Examiner — Linh Nguyen
(74) Attorney, Agent, or Firm — Keating & Bennett, LLP

(57) ABSTRACT

A mobile communication device, such as a cellular phone, for example, is capable of functioning in a transmitter disabling mode and is set to the transmitter disabling mode in automatic response to a power-on operation and then automatically changed to a transmitter enabling mode provided that a predetermined condition is confirmed. The communication device is instantly set to the transmitter disabling mode in automatic response to the initiation of use of an earphone or camera function and kept in the transmitter disabling mode even if the earphone or camera function enters an out of use condition. Surrounding people are informed of the transmitter disabling mode without fail by a standardized appearance of the earphone or a standardized blinking of a flash unit of the camera function.

14 Claims, 4 Drawing Sheets

MOBILE COMMUNICATION DEVICE CAPABLE OF FUNCTIONING IN TRANSMITTER DISABLING STATE

BACKGROUND OF THE INVENTION

1. Field of the Invention

The present invention relates to mobile communication devices, such as cellular phones, for example.

2. Description of the Related Art

A mobile communication device basically includes a transmitter for generating radio waves to provide a telecommunicating function. The radio wave, however, is sometimes undesirable or prohibited in some places such as in a hospital, on an airplane, or on a train, for example.

A typical way to avoid the radio wave transmission in a place where it is prohibited is to turn off the power of the mobile communication device. As an alternative way, "transmitter disabling mode" has been proposed in which the mobile communication device is kept in a power-on state with the transmitter disabled.

For the purpose of informing the surrounding people of the fact that the mobile communication device is used in the transmitter disabling mode, a standardized icon or symbol indicative of the transmitter disabling mode has also been proposed.

SUMMARY OF THE INVENTION

Preferred embodiments of the present invention provide a mobile communication device having an improved harmonization between the user of the mobile communication device and the surrounding people in a place where a radio wave is prohibited.

Preferred embodiments of the present invention also provide a mobile communication device capable of functioning in the transmitter disabling state.

Preferred embodiments of the present invention also provide a mobile communication device in which the reliability of informing the surrounding people of the transmitter disabling mode is improved.

Still more preferred embodiments of the present invention also provide a mobile communication device in which accidental or undesirable radio wave transmission is prevented.

A preferred embodiment of the present invention provides a mobile communication device capable of functioning in a transmitter disabling state including a transmitter arranged to generate radio waves used in telecommunication functions, a selector arranged to selectively set the mobile communication device between a first mode of functioning in which the transmitter enabled and a second mode of functioning in which the transmitter is disabled, a power switch arranged to switch the mobile communication device from an inoperable state to an operative state; and a controller arranged to automatically set the mobile communication device in the second mode in response to an operation of a power switch and then automatically change the mobile communication device from the second mode to the first mode once a predetermined condition is confirmed.

One of the advantages achieved by the preferred embodiment described above is that an accidental or unexpected transmission of the radio wave can be avoided in a place where the radio wave is prohibited. In other words, the mobile communication device is set to the second mode upon power-on of on the safe side and the mobile communication device would never be changed from the second mode to the first mode unless the predetermined condition is confirmed.

An example of the predetermined condition is where a manually operable unit arranged to have the selector select the second mode does not operate. Another example of the predetermined condition is where a function unit capable of functioning in the second mode is not in use. Another example of the predetermined condition is where a confirmation that the mobile communication device is not in a place where the radiation is prohibited.

A typical example of the above mentioned function unit capable of functioning in the second mode is an audio function unit. In more detail, the audio function unit may include be an earphone set, and the controller may detect an attachment of the earphone set to the mobile communication device as the predetermined condition. The earphone set may be preferably of a dedicated-type arranged to be exclusively used in the second mode. Another typical example of the function unit capable of functioning in the second mode is a camera function unit.

According to another preferred embodiment of the present invention, a mobile communication device capable of functioning in a transmitter disabling state is provided, the mobile communication device including a transmitter arranged to generate a radio wave used in telecommunication functions, a selector arranged to selectively set the mobile communication device between a first mode of functioning in which the transmitter is enabled and a second mode of functioning in which the transmitter is disabled, a function unit capable of functioning in the second mode, and a controller arranged to automatically set the mobile communication device to the second mode in response to the initiation of use of the function unit and to keep the mobile communication device in the second mode even if the function unit enters an out of use condition.

One of the advantages achieved by the above preferred embodiment is that the mobile communication device is instantly set to the second mode in an automatic response to the initiation of use of the function unit. On the other hand, an accidental or unexpected transmission is avoided by the controller which keeps the mobile communication device in the second mode even if the function unit enters an out of use condition.

In a detailed design according to the above preferred embodiment, the mobile communication device preferably further includes a manually operable unit arranged to have the selector select the first mode, wherein the controller is arranged to change the mobile communication device from the second mode to the first mode in response to the manually operable unit. As a result, an intentional change to the first mode is possible.

For the purpose of a more careful change to the first mode on the safe side, the controller may be arranged to change the mobile communication device from the second mode to the first mode in response to the second operation of the manually operable unit. In this case the mobile communication device may further include an indicator arranged to inform the user of the necessity of the second operation of the manually operable unit.

An example of the above mentioned accidental or unexpected transmission of the radio wave may occur in which the function unit includes an earphone set. In this case, the function unit enters the out of use condition if the earphone set drops off the mobile communication device. In such a situation, the radio wave would be undesirably caused if the mobile communication device were designed to be instantly changed from the second mode to the first mode in automatic response to the occurrence of the out of use condition of the function unit.

According to another preferred embodiment of the present invention, a mobile communication device capable of functioning in a transmitter disabling state is provided, the mobile communication device including a transmitter arranged to generate a radio wave used in telecommunication functions, a selector arranged to selectively set the mobile communication device between a first mode of functioning in which the transmitter is enabled and a second mode of functioning in which the transmitter is disabled, a notification unit arranged to inform the surrounding people of the fact that the mobile communication device is used in the second mode, and a controller arranged to assure that the notification unit works without fail as long as the mobile communication device is used in the second mode.

One of the advantages of the above preferred embodiment is that the surrounding people are informed of the transmitter disabling mode with high reliability.

The notification unit preferably includes an attachment which is in use in the second mode. The notification may be effected by a standardized color of the attachment, or alternatively, the notification may be effected by a standardized symbol marked on the attachment. A typical example of the attachment is an earphone set, for example. However, any other desirable attachment could be used.

The mobile communication device may further include a camera unit capable of functioning in the second mode. In this case, the notification unit may include an illumination unit prepared for the camera function. In more detail, the notification may be effected by a standardized emission of light from the illumination unit.

Other features, elements, arrangements, steps, characteristics, and advantages according to the present invention will be readily understood from the detailed description of the preferred embodiments in conjunction with the accompanying drawings.

DETAILED DESCRIPTION OF THE PREFERRED EMBODIMENTS

Figure 1:
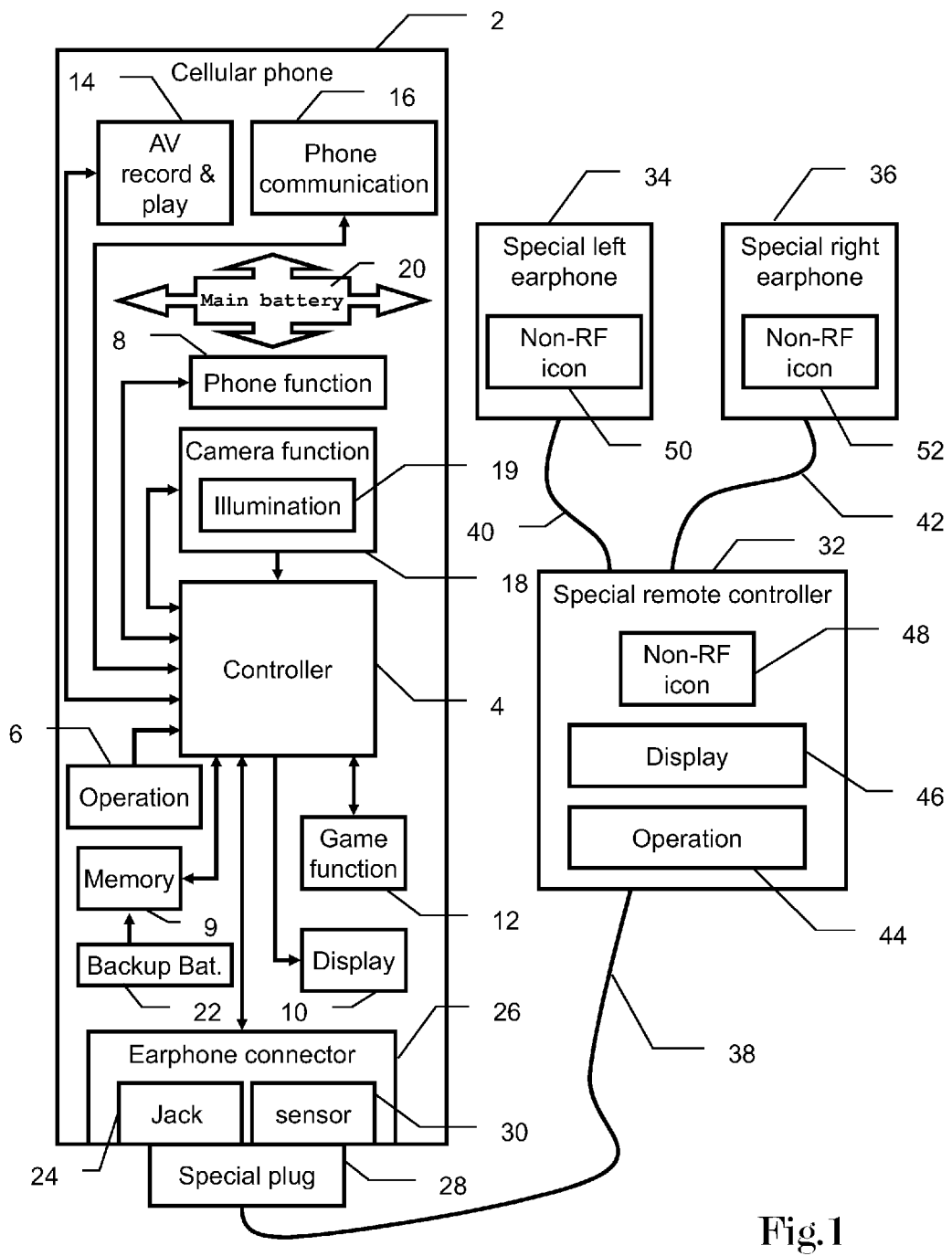
FIG. 1 represents a block diagram of a preferred embodiment of the present invention relating to a mobile communication device.

FIG. 1 represents a block diagram of a preferred embodiment of this invention relating to a mobile communication device. The present invention is preferably embodied as a cellular phone 2 including controller 4 such as a microcomputer arranged to control the entire cellular phone 2, for example. However, any other desirable mobile communication device and/or controller could be used. The controller 4 preferably controls various blocks such as phone function block 8, for example, in response to operation block 6. Operation block 6 is further arranged to function as a power switch. Phone function block 8 provides ordinary telephone functions, such as processing audio signals, sampling voice with a microphone and generating voice with a speaker, for example.

The function of controller 4 is preferably performed in accordance with a software programs stored in memory 9. Memory 9 also preferably stores various data necessary for the function of cellular phone 2 on the temporally and progressive basis, and also various information such as personal address list or phone number list to be accumulated in cellular phone 2. Controller 4 further controls a display 10 arranged to provide a graphical user interface (GUI) in conjunction with the operation at operation block 6 to indicate the result of the operation.

Controller 4 also preferably controls a game function block 12, which functions either in an off-line mode enjoyed by cellular phone 2 by itself and in an on-line mode in which a game is played in cooperation with another person. The playing of the game is preferably performed by the GUI with operation block 6 and display 10. Controller 4 preferably further controls an audiovisual record and play block 14 arranged to record or reproduce music or video contents. The recording and reproduction by audiovisual record and play block 14 is also performed by the GUI with operation block 6 and display 10. Audiovisual record and play block 14 also preferably functions in an off-line mode enjoyed by cellular phone 2 by itself and in an on-line mode in which music or video contents are downloaded through the internet.

Cellular phone 2 is capable of performing the ordinary phone conversation through the telephone infrastructure on which phone function block 8 and phone communication block 16 function. Although not shown in FIG. 1, cellular phone 2 preferably includes a block capable of close range telecommunication such as wireless local area network (WLAN) or "Bluetooth (Trade Mark)" or faint radio communication, for example, to communicate with another neighboring cellular phone within the close telecommunication range. Such a close range telecommunication is under a limit of available range, but it preferably does not result in a telephone bill which would be necessary in the case of ordinary telephone conversation.

Cellular phone 2 includes camera function block 18 arranged to take a picture, which is capable of being stored in memory 9 as a digital image data and also capable of being transmitted to another cellular phone through phone communication block 16. In other words, camera function block 18 is capable of functioning in an off-line mode enjoyed by cellular phone 2 by itself and in an on-line mode in which digital image data is sent or received directly as well as uploaded or downloaded by way of the internet. Camera function block 18 preferably includes an illumination block 19 arranged to emit light toward an object field on or before/after a shot timing to fill light in the picture or illuminating an object to be focused on under a condition where the ambient light is relatively dark. Illumination block 19 is located close to the camera lens and faces the same direction toward which the camera lens is aimed. Illumination block 19 preferably includes a white light emitting diode (LED) or a xenon flash tube, for example.

All elements in cellular phone 2 are preferably supplied with electric power by rechargeable main battery 20. In contrast to the other elements, memory 9 is preferably further capable of being powered by back up battery 22 to prevent memory 9 from losing data therein due to exhaustion or exchange of main battery 20.

Cellular phone 2 preferably includes earphone connector block 26 including earphone jack 24 into which an earphone plug is inserted. Earphone jack 24 is preferably capable of accepting both an ordinary earphone plug and special plug 28 of a dedicated earphone set that is specially designed for use in the transmitter disabling mode. Earphone connector block 26 preferably further includes mechanical sensor 30 arranged to identify special plug 28 when it is inserted into earphone jack 24.

Dedicated earphone set preferably includes special earphone plug 28, special remote controller 32, special left earphone 34 and special right earphone 36. Special earphone plug 28 and special remote controller 32 are preferably connected with cable 38, while special left earphone 34 and special right earphone 36 are preferably connected to special remote controller 32 by cables 40 and 42, respectively.

Special remote controller 32, special left earphone 34, special right earphone 36 and connecting cables 38, 40 and 42 are preferably each of a standardized color (such as green, for example) to inform surrounding people of the fact that cellular phone 2 is being used in the transmitter disabling mode. Special remote controller 32 preferably includes operation block 44 and display 46 for GUI in cooperation. Special remote controller 32 is also preferably provided with Non-RF (Non-Radio Frequency) icon 48 standardized and fixedly located at a highly visible portion to inform the surrounding people of the fact that cellular phone 2 is being used in the transmitter disabling mode. Special left earphone 34 and special right earphone 36 are also preferably provided with Non-RF icons 50 and 52 standardized and fixedly located at highly visible portions for the similar purpose, respectively. In addition, the connecting cables 38, 40 and 42 in the dedicated earphone set can also be provided with the standardized Non-RF icons in the forms of flags, respectively.

According to the above features of the present preferred embodiment, people around the cellular phone 2 user can understand that the cellular phone 2 is used in the transmitter disabling mode by the appearance of cellular phone 2 with the dedicated earphone set connected which has the standardized appearance color or the icon. Cellular phone 2 is designed not to function in transmitter enabling mode as long as the dedicated earphone set is connected so that the information to the surrounding people by the color or the Non-RF icon may not be inconsistent with the true condition of cellular phone 2. This will be discussed later in more detail.

The dedicated earphone set discussed above is arranged to be used with audiovisual recording and play block 14 or game function block 12 where cellular phone 2 basically functions by itself in off-line condition. Similarly, camera function block 18 relates to the function with cellular phone 2 basically in off-line condition. Therefore, illumination block 19 used with camera function block 18 is designed to emit light of a standardized color (such as green, for example, to be in conformity with the color of the dedicated earphone as a universally standardized color) throughout the period when cellular phone 2 is used in the transmitter disabling mode to inform the surrounding people of the condition of cellular phone 2. In more detail, lighting block 19 is designed to emit green light indicative of the transmitter disabling mode with less energy than when emitting the ordinary fill-in-flash light used in photography in order to save power consumption. Further, the manner of green light emission by illumination block 19 is standardized for the purpose of effective notification of the transmitter disabling mode. In other words, illumination block 19 is preferably designed to blink or intermittently emit green light with a standardized pattern so that the surrounding people may easily notice the occurrence of the green light emission and recognize its meaning that cellular phone 2 is used in the transmitter disabling mode.

For achieving the above function to emit light with a different color and pattern, illumination block 19 preferably includes a separate green light source using the same light emitting window through which the ordinary fill-in-flash light from a separate flash light source passes. Alternatively, a common light source of the ordinary white fill-in-flash light and green information light can be adopted in which the common light source is differently controlled in the dual purposes with color filter replaced in front of the common light source. A controller of the separate light sources or common light source may include either separate circuits for the dual purpose, respectively, or common circuit capable of dual function.

Figure 2:
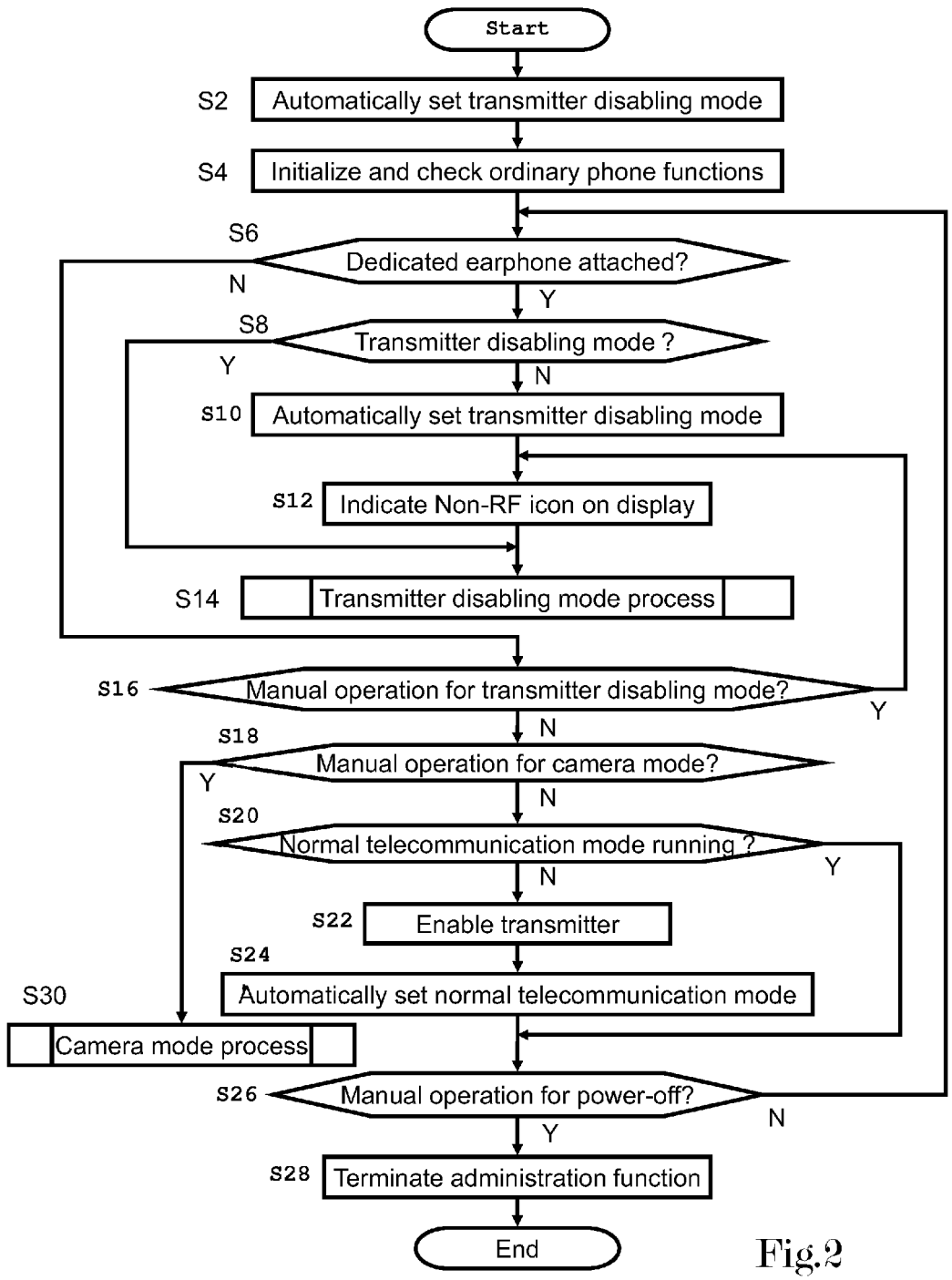
FIG. 2 represents a flowchart of the basic function for the mode changing performed by a controller of the preferred embodiment in FIG. 1.

FIG. 2 represents a flowchart of the basic function for the mode changing performed by controller 4 of the present preferred embodiment in FIG. 1. Since the details in respective modes are well known in ordinary cellular phone, explanations thereof are omitted in FIG. 2. The flow in FIG. 2 starts when the power switch of cellular phone 2 is turned on to go to step S2, in which the transmitter disabling mode is forcibly and automatically set. In other words, cellular phone 2 according to a preferred embodiment of the present invention automatically starts up with the transmitter disabling mode. This is advantageous in that such an unexpected accident due to radio wave transmission that cellular phone 2 is unwittingly turned on at a place where radio wave transmission is prohibited. Step S2 is also advantageous in that cellular phone 2 properly starts its function with the dedicated earphone set having been connected to cellular phone 2. Next, in step S4, ordinary functions of cellular phone 2 are initialized and checked.

After the initializing and checking, the functions of cellular phone 2 in step S4, the flow advances to step S6, in which it is checked whether or not the dedicated earphone set is connected to cellular phone 2, the check being possible in accordance with the output from mechanical sensor 30 in FIG. 1. If it is detected in step S6 that the dedicated earphone set is attached to cellular phone 2, the flow advances to step S8, in which it is checked whether or not the transmitter disabled mode has been set. If not, the flow advances to step S10 to automatically set the transmitter disabled mode. During steps S6 to S10, cellular phone 2 cannot function in the transmitter enabled mode as long as the dedicated earphone set is attached to cellular phone 2. Next, in step S12, the Non-RF icon indicative of the transmitter disabled mode is directed to be displayed on display 10, and step S14 follows.

The reason why step S10 is needed in addition to step S2 where transmitter disabling mode has been set is that cellular phone 2 has to be set into transmitter disabling mode at step S10 in case cellular phone 2 was changed into the transmitter enabling mode after power-on operation and the dedicated earphone set is afterward attached to cellular phone 2. On the other hand, if cellular phone 2 is turned on with the dedicated earphone set having already been attached, the flow advances from step S8 directly to step S14. In step S14, transmitter disabling mode process is carried out, the details of step S14 being to be explained later.

If it is not detected in step S6 that the dedicated earphone set is attached to cellular phone 2, the flow advances to step S16 to check whether or not a manual operation to select the transmitter disabling mode is done. If such a manual setting operation is detected in step S16, the flow goes to step S14 by way of step S12 in which the Non-RF icon is displayed. Thus, the transmitter disabling mode can optionally be set, as in the conventional cellular phone, even if the dedicated earphone set is not attached to cellular phone 2.

If it is not detected in step S16 that any manual operation is done for setting the transmitter disabling mode, the flow goes to step S18 to check whether or not a manual operation for selecting camera mode is done. If the operation is not detected in step S18, the flow goes to step S20 to check whether or not the normal telecommunication is running. If not the flow goes to step S22 to enable the transmitter to generate radiation wave, and the normal telecommunication mode, i.e., transmitter enabling mode is automatically set in step S24. Thus, if the dedicated earphone set is not attached and any manual operation is not done, cellular phone 2 automatically goes into the normal telecommunication mode in step S24 by way of step S6 and steps S16 to S22.

After the automatic setting to the normal telecommunication mode in step S24, the flow advances to step S26 where it is checked whether a manual operation for power-off is made. If not, the flow returns to step S6. As has been stated, if it is detected in step S6 that the dedicated earphone is attached, the flow advances to step S10 by way of step S8 to forcibly set the transmitter to the disabling mode. On the other hand, if it is not detected in step S6 that dedicated earphone is attached, the flow goes to step S16 followed by step S20 if no further operation is made. In this case, the flow goes directly goes from step S20 to step S26 since the normal telecommunication mode has been set. Thus, the flow will repeat steps S6 to S26 unless nothing is detected in steps S6, S16, S18 and S26.

If the power-off operation is detected in step S26, the flow goes to step S28 where the administration function is terminated followed by the end of the flow. If the manual operation for selecting camera mode is detected in step S18, the flow goes to step S30 for camera mode process. As has been commented above, the flow in FIG. 2 is limited to the administration function for the mode changing, other ordinary functions for cellular phone 2 caused by the normal telecommunication mode setting in step S24 are omitted.

Figure 3:
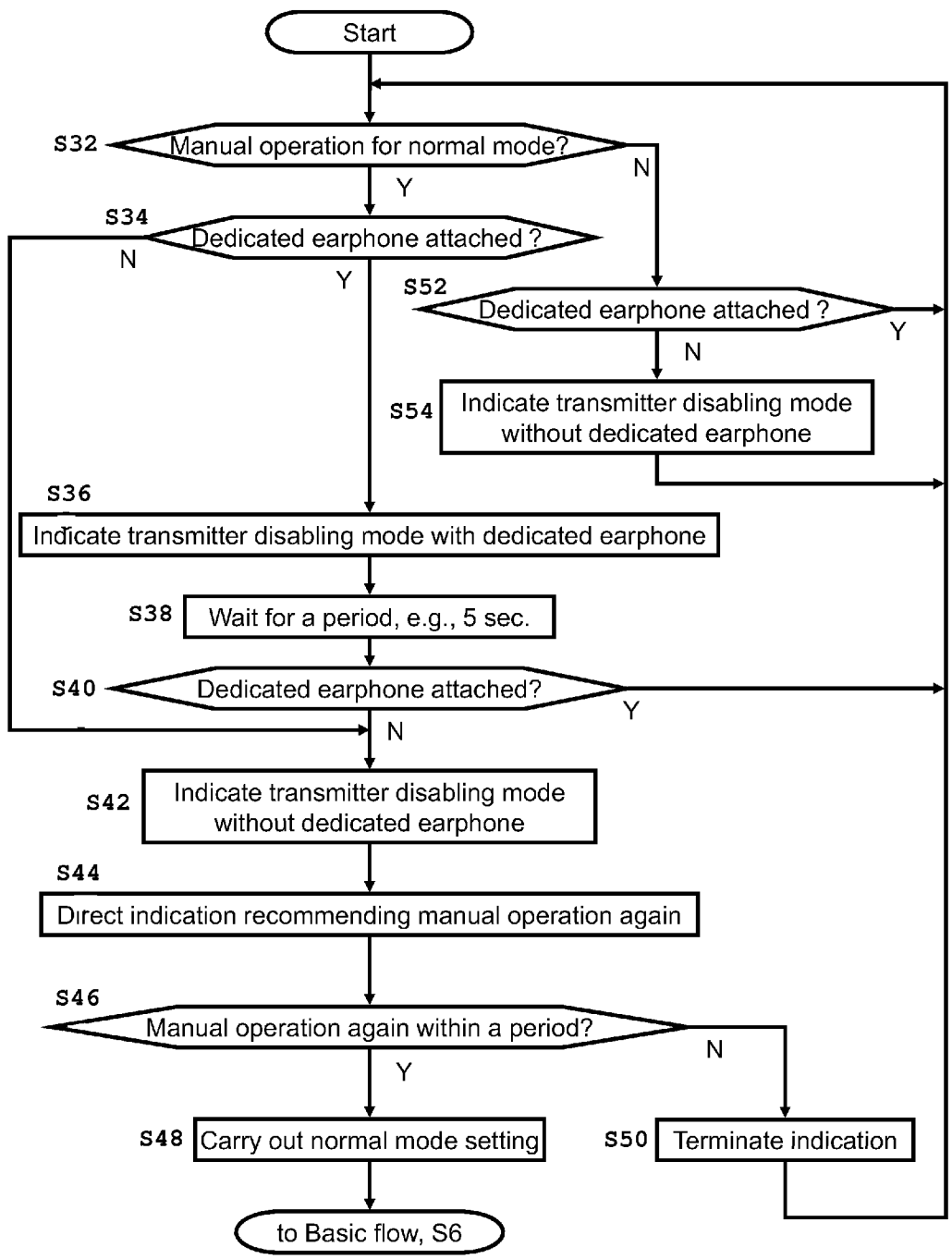
FIG. 3 represents the details of step S14 in FIG. 2 for the process in the transmitter disabling mode.

FIG. 3 represents specific details of step S14 in FIG. 2 for the process in the transmitter disabling mode. If the flow in FIG. 3 starts, it is checked in step S32 whether or not a manual operation for setting the normal telecommunication mode is done. If the manual operation is detected in step S32, the flow advances to step S34 where it is checked whether or not cellular phone 2 is used with the dedicated earphone set attached. This is because that step 14 can be caused by way of step S16 where a manual operation is detected with the dedicated earphone set not attached as well as by way of step S10 where the transmitter disabling mode is achieved in automatic response to the attachment of the dedicated earphone set as in FIG. 2.

If it is detected in step S34 that cellular phone 2 is used with the dedicated earphone set attached, the flow goes to step S36 where an indication is made to notice that transmission is disabled when dedicated earphone set attached. Next, in step S38, the flow waits until a predetermined period of time, e.g., 5 seconds, has passed to go ahead to step S40, where it is checked whether or not cellular phone 2 is still used with the dedicated earphone set attached. In other words, it is expected during the predetermined period of time that the user removes the dedicated earphone set in response to the indication made in step S36. If it is detected in step S40 that the dedicated earphone set is removed, the flow goes to step S42 to indicate that transmitter disabled mode is set with the dedicated earphone set not attached to cellular phone 2.

As is apparent from the above explanation, with cellular phone 2 having been once set to the transmitter disabling mode, such an administration is carried out that cellular phone 2 cannot be simply switched into the transmitter enabling mode even if a manual operation to select the transmitter enabling mode is only done once. This is done to ensure that the transmitter enabling mode can be no more set as long as cellular phone 2 is used with the dedicated earphone set. In other words, the credit of indication with the color or icon by the dedicated earphone set not to generate radio wave is assured. Further, even if the dedicated earphone is merely removed, the transmitter enabling mode cannot automatically result as in steps S40 and S42. This is done to avoid such an accident in which a manual operation for setting the transmitter enabling mode is inadequately done at a place where radio wave is prohibited and the dedicated earphone set erroneously drops off cellular phone 2, which would otherwise causes undesirable radio wave. In other words, the functions insteps S40 and 42 make it possible that an accidental radio wave generation is avoided although the dedicated earphone set may lose the role of indicating transmitter disabling mode by its dropping off of the cellular phone 2.

Next, an indication is directed in step S44 to recommend the user to again make the manual operation for setting the transmitter enabling mode if he or she still likes it. And, it is checked in step S46 whether or not the manual operation for setting the transmitter enabling mode is actually done within a predetermined period of time after the start of indication directed in step S44. Thus, only if the manual operation is detected again within the time period in step S46, the flow can advance to step S48 to actually carry out the setting of the transmitter enabling mode, then the flow going to step S6 of the main flow in FIG. 2. If the manual operation fails to be detected in step 46 within the predetermined time period, the flow goes to step S50 to terminate the indication started in step S44 and to return to step S32. In other words, it is assumed that the user does not really desire the transmitter enabling mode if the manual operation is failed to be detected within the time period in step 46.

In the case above that the manual operation for setting the normal telecommunication mode is detected in step S32 with the flow having returned to step S32 by way of step S46, it is detected in the next step S34 that the dedicated earphone set is not attached. Thus, the flow directly goes to step S42 followed by steps S44 and S46. Similarly, in a case where the manual operation for setting the normal telecommunication mode is detected in step S32 under the condition that the flow of FIG. 3 having started with the dedicated earphone set not attached from the beginning, which may typically occur when the flow comes to step S14 by way of step S16, it is detected in the next step S34 that the dedicated earphone set is not attached. Also in this case, the flow directly goes to step S42 followed by steps S44 and S46. In any way, the actual normal telecommunication setting by step S48 is carried out only when the second manual operation is detected in step S46 in addition to the detection of the first manual operation in step S32.

If it is not detected in step S32 that the manual operation for setting the normal telecommunication mode is done, the flow goes to step S52 where it is checked whether or not the dedicated earphone set is attached to cellular phone 2. If not, the flow goes to step S54 to indicate that the transmitter disabled mode is set with the dedicated earphone set not attached to cellular phone 2, the flow then returning to step S32. On the other hand, if it is detected in step S52 that the dedicated earphone set is attached to cellular phone 2, the flow directly returns to step S32. Thus, the flow will repeat steps S32, S52 (and S54) unless the manual operation for setting the normal telecommunication mode is detected in step S32. Also in FIG. 3, the flow and its explanations are limited to the administration function for changing modes, and any additional explanation for the function of audio playback or game play itself, which can be enjoyed during the transmitter disabled mode, is omitted since they are well known in an ordinary cellular phone.

If it is detected in step S40 that the dedicated earphone set is attached to cellular phone 2, the flow returns to step S32.

This means that the flow assumes that the user has no intention to remove the dedicated earphone set from cellular phone 2 for all the indication in step S36 are the waiting time in step S38. Thus, steps S32 to S46 and S50 to S54 are repeated unless it is detected in step S46 that the second manual operation for setting the normal telecommunication mode for enabling the transmitter. In accordance with the way explained above, the flow in FIG. 3 is prepared for an inadequate erroneous normal telecommunication mode setting or an unexpected removal of the dedicated earphone set.

As is apparent from the above explanation of the above preferred embodiment of the present invention, the cellular phone 2 is changed into the transmitter disabling mode in automatic response to only the attachment of the dedicated earphone set by steps S6 to S12 in FIG. 2. On the other hand, the cellular phone 2 never does come back to the transmitter enabling mode unless the second manual operation is detected with the dedicated earphone set removed from cellular phone 2. In other words, the cellular phone 2 is not changed back to the transmitter enabling mode in automatic response to the removal of the dedicated earphone set from cellular phone 2, nor in an absolute response to a manual operation to set the normal telecommunication mode in which the transmitter enabled. Thus, an unexpected radiation wave emission is prevented even if the dedicated earphone set accidentally drops out of cellular phone 2. Thus, the above preferred embodiment ensures that no radio wave is transmitted as long as the dedicated earphone set is attached to cellular phone 2. This is realized by the change into the transmission disabling mode regardless of the will of the user in automatic response to the attachment of the dedicated earphone set to cellular phone 2, and by the conditional change back to the transmission enabling mode with unexpected radiation wave emission avoided. According to the above preferred embodiment, the condition of the change back to the transmission enabling mode is the reconfirmation of the will of the user. However, this invention is not limited to such a condition, but is applicable to various cases. For example, the condition may be a detection of a circumstance where radiation wave emission is allowed. In other words, such a condition is a detection that cellular phone 2 is not in a hospital or on airplane or train where radiation wave emission is prohibited.

According to the above preferred embodiment, the cellular phone 2 is preferably launched with the transmitter disabled mode by step S2 in FIG. 2 for the purpose of avoiding an unexpected accident due to the radio wave emission upon power-on of cellular phone 2. And, cellular phone 2 is automatically switched into the transmitter enabled mode in steps S22 and S24 for normal telecommunication by way of various careful checks for allowance of radio wave emission such as non-attachment of the dedicated earphone set in step S6, non-operation for manual selection of the transmitter disabling mode in step S16, and non-selection of camera mode in step S18. However, this invention is not limited to such checks for allowance of radio wave emission, but other checks for the same purpose are also possible. For example, other checks may include a detection of a circumstance where radiation wave emission is allowed. In other words, such a check is applicable that cellular phone 2 is not in a hospital or on airplane or train where radiation wave emission is prohibited.

According to the above preferred embodiment, the mechanical sensor 30 in FIG. 1 is preferably arranged to check the detection of the dedicated earphone set to cellular phone 2. However, this invention is not limited to such a check, and other ways are applicable for checking whether or not dedicated plug 28 is inserted in earphone jack 24. For example, an identification signal from the dedicated earphone set may be received through the electric connection between dedicated plug 28 and earphone jack 24 for authentication of the attached dedicated earphone set by controller 4 of cellular phone 2.

Figure 4:
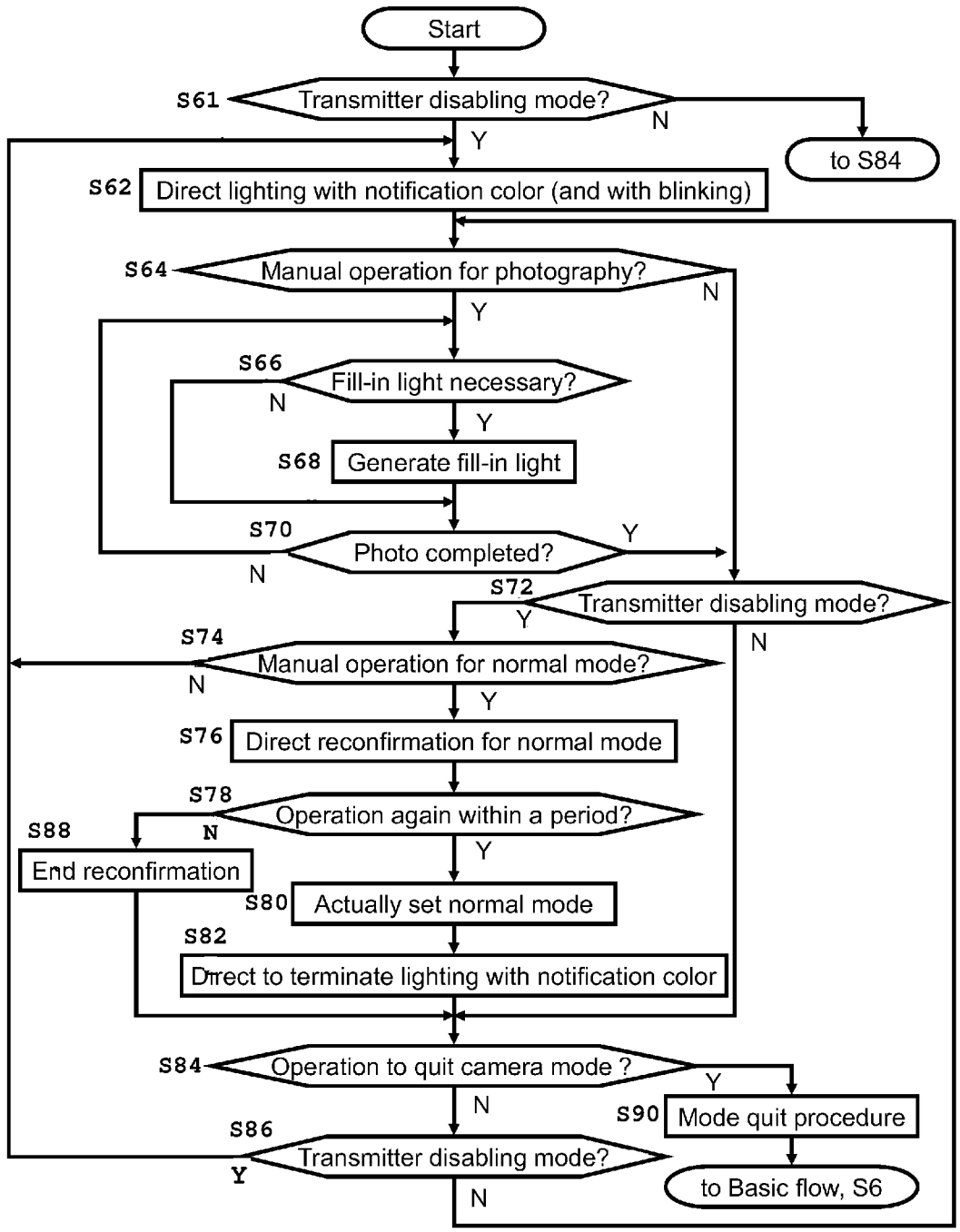
FIG. 4 represents a detailed flowchart of the camera mode process of step S30 in FIG. 2.

FIG. 4 represents a detailed flowchart of the camera mode process of step S30 in FIG. 2. Since the detail in the ordinary camera function itself is well known in ordinary cellular phones, explanation thereof is omitted in FIG. 4, but the explanation is focused on the administrative function for changing modes of the cellular phone 2. As is clear in FIG. 1, camera function block 18 preferably includes illumination block 19. If the flow in FIG. 4 starts and it is detected in step S61 that cellular phone 2 is in the transmitter disabling mode, illumination block 19 is directed in step S62 to inform the surrounding people of the transmitter disabling mode by its lighting with a unique notifying color (such as green, for example), which is different from the white color used in the ordinary fill-in function in photography. Illumination block 19 may blink with the notifying color to increase the notifying capability.

The notification by illumination block 19 with the unique color light for informing of the transmitter disabling mode started in step S62 basically continues as long as cellular phone 2 is kept in the camera mode. By way of the function of steps S64 to S70, however, the notification by illumination block 19 with the unique color light is intermittent during photography if the ordinary white fill-in light from illumination block 19 is required. The notification by illumination block 19 with the unique color light is also terminated due to the function of steps S72 to S82 if cellular phone 2 is changed from the transmitter disabling mode to the normal telecommunication mode with some necessary processes included.

Now the details of camera mode process in step S30 in FIG. 2 is to be explained step by step in the flowchart of FIG. 4. If the flow starts in FIG. 4, it is checked in step S62 whether or not cellular phone 2 is set to the transmission disabling mode. This is because that the flow in FIG. 2 comes to step S30 through one of the two possible ways, the first to directly come to step S30 with the setting by step S2 to the transmitter disabling mode maintained as it is, and the second to come to step S30 with the normal telecommunication set in step S24 and by way of steps S6 and S16. If it is detected in step S61 that cellular phone 2 is in the transmitter disabling mode, the flow advances to step S62 for directing illumination block 19 to start blinking with the notifying color, by which the surrounding people are informed of the transmitter disabling mode setting. The user of cellular phone 2 is incapable of arbitrarily canceling the blinking of illumination block 19 on its own. In contrast to that, an ordinary alarm function of cellular phone 2 can be arbitrarily selected between a blinking mode with a notification desired and non-blinking mode with any notification not desired by a GUI function through the combination of operation block 6 and display block 10. But, the above mentioned notification with the blinking of illumination block 19 does occur once a camera mode is selected with the transmitter disabling mode set. In other words, non-blinking cannot be arbitrarily selected in the camera mode with the transmitter disabling mode set. Thus, reliability on the blinking is assured.

Next, it is checked in step S64 whether or not a manual operation such as camera shutter release is made. If such a manual operation is detected, the flow goes to step S66 to check whether or the not fill-in lighting is needed for photography. The check in step S66 is done on the basis of a detection of the average intensity of the ambient light or a specific backlit subject. If it is detected in step S66 that the fill-in lighting is necessary, the flow goes to step S68 to have illumination block 19 generate the ordinary white fill-in light. In this instant of time, the notification by illumination block 19 with the unique color light started in step S62 is temporarily extinguished to avoid an undesirable influence on the photography. Such temporary extinguishing of the notification light, however, causes no problem in notifying the transmitter disabling mode since the intermission interval corresponds to the exposure time for photography as will be mentioned later, which is very short. Next in step S70 it is checked whether or not the photography is completed. If not, the flow returns to step S66. If it is detected in step S66 that the fill-in lighting is not necessary, on the other hand, the flow directly goes to step S70. In this case, the notification by illumination block 19 with the unique color light started in step S62 continues during the photography. The notification lighting with the unique color such as green would not have substantial influence on the photography since the relative intensity of the notification light is sufficiently weaker than that of the ambient light in the situation where the fill-in lighting is not necessary. If it is not detected in step S64 that a manual operation is made, the flow directly goes to step S72. In the manner above, the flow repeats steps from S66 to S70 unless the completion of the photography is detected in step S70.

If the completion of the photography is detected in step S70, the flow goes to step S72 to check whether or not the transmitter disabling mode is set. If it is detected in step S72 that cellular phone 2 is in the transmitter disabling mode, the flow goes to step S74 to check whether or not a manual operation is made for the purpose of setting cellular phone 2 into the normal telecommunication mode in which the transmitter is enabled. If not, the flow returns to step S62 in which illumination block 19 is directed to resume the lighting with the notification color indicative of the transmitter disabling mode. Thus, steps S62 to S74 are repeated to keep the transmitter disabling mode unless the manual operation for the normal telecommunication mode is detected in step S74. As has been mentioned above, the normal full-in lighting started in step S68 for photography is shortly returned to the notification lighting in step S62 due to the completion of the photography by way of steps S70 to S74, the interval of intermission of the unique color light for notifying the transmitter disabling mode is very short corresponding to the exposure time for photography.

On the other hand, if the manual operation for the purpose of setting the normal telecommunication is detected in step S74, the flow goes to step S76 where display 10 is directed to make a reconfirmation indication for asking whether the use really desires to change the mode setting into the normal telecommunication mode. Next in step S78, it is checked whether or not a further manual operation for the normal telecommunication mode is made by the user in response to the reconfirmation within a predetermined period of time after the initiation of the reconfirmation indication. And, only if the manual operation for the normal telecommunication mode is detected again within the predetermined time in step S78, the flow can advance to step S80 to actually carry out the setting into the normal telecommunication mode in which the transmitter is enabled. Correspond to the mode change, in step S82, illumination block 19 is directed to terminate the lighting with the unique color for notifying the transmitter disabling mode.

Next, in step S84, it is checked whether or not a manual operation for quitting the camera mode is made. It should be noted that step S84 also results if it is detected in step S72 that cellular phone 2 is not in the transmitter disabling mode. Similarly, step S84 further results if it is detected in step S61 that cellular phone 2 is not in the transmitter disabling mode. If any manual operation for quitting the camera mode is not detected in step S84, the flow advances to step S86 to check whether cellular phone 2 is in the transmitter disabling mode. If so, the flow returns to step S62 in which illumination block 19 is directed to resume the lighting with the notification color indicative of the transmitter disabling mode. On the other hand, if it is detected in step S86 that the cellular phone is not in the transmitter disabling mode, the flow returns to step S64. If no manual operation for the normal telecommunication mode is detected in step S78 within a predetermined period of time, the flow goes to step S88 to end the reconfirmation indication followed by step S84. If the manual operation for quitting the camera mode is detected in step S84, the flow goes to step S90 to carry out the camera mode quitting process, which is followed by step S6 in the basic flow in FIG. 2

As in the above, steps S62 to S86 are repeated unless the manual operation for quitting camera mode is detected in step S84. During the repetition, illumination block 19 continues to generate the notification light of the unique color as long as cellular phone 2 is in the transmitter disabling mode for informing the surrounding people thereof. In the repetition, the change from the transmitter disabling mode to the normal telecommunication mode is carried out through the extremely careful process insteps S74 to S80. In contrast to the above, the change from the normal telecommunication mode to the transmitter disabling mode is quickly carried out in the camera mode in response to the manual operation which is detected in step S72 or step S86 to instantly cause the direction in step S62 for illumination block 19 to generate the notification light of the unique color.

The manner of notifying that the camera function is used in the transmitter disabling mode is not limited to the utilization of illumination block 19 as in the above preferred embodiment. But, various modifications of the manner of notification are possible. For example, in the case where cellular phone 2 is designed as a foldable type with inner and outer display windows, the outer window facing the surrounding people may be utilized for notifying the transmitter disabling mode. In this case, the standardized icon used to indicate the transmitter disabling mode may be indicated on the outer display window in response to the direction in step S62 in FIG. 4. Or, alternatively, the entire outer display window may blink with the unique color such as green in response to the direction in step S62 in FIG. 4.

Further, such a modification is possible that an announcement (e.g., "Green Mode!, Green Mode!") indicative of the transmitter disabling mode may be made in synchronism with the indication on the outer display window in response to the direction in step S62 in FIG. 4. The number of repetitions of such an announcement may be limited not to bother the surrounding people who can understand the situation when once being informed of the transmitter disabling mode. This is because that a person in the place where radiation emission is prohibited tends to remain in the same place for a period. Preferably, a set of the announcement may include the repetition of twice in about three seconds, for example, and the one set may be repeated every one minute for the case that the former person may replaced by a new one. The notification of the transmitter disabling mode by the above mentioned announcement may be made not only in the camera mode, but also in the case that the dedicated earphone set is used.

While preferred embodiments of the present invention have been described above, it is to be understood that variations and modifications will be apparent to those skilled in the art without departing the scope and spirit of the present inven-

What is claimed is:

1. A mobile communication device comprising:
    a transmitter arranged to generate radio waves used in a telecommunication function;
    a selector arranged to selectively switch the mobile communication device between a first mode of functioning in which the transmitter is enabled, and a second mode of functioning in which the transmitter is disabled;
    an earphone jack into which a detachable earphone set is capable of being inserted to enable the second mode; and
    a controller arranged to ensure that the second mode will be continued for as long as the detachable earphone set is inserted into the earphone jack and that the first mode cannot be performed as long as the detachable earphone set is inserted into the earphone jack.

2. The mobile communication device according to claim 1, wherein the detachable earphone set is of a standardized appearance which indicates an exclusive use of the second mode.

3. The mobile communication device according to claim 1, wherein the detachable earphone set is provided with a standardized symbol marked on an appearance thereof which indicates an exclusive use of the second mode.

4. The mobile communication device according to claim 1, wherein the detachable earphone set is of a specialized type for exclusive use during the second mode, and wherein the controller includes a sensor arranged to sense that the earphone set of the specialized type is inserted into the earphone jack.

5. The mobile communication device according to claim 4, wherein the controller is arranged to allow the first mode to be selected when another type of earphone set is inserted into the earphone jack if the sensor does not sense that the inserted earphone set is of the specialized type.

6. A combination of a mobile communication device and a detachable earphone set, the mobile communication device comprising:
    a transmitter arranged to generate radio waves used in a telecommunication function;
    a selector arranged to selectively switch the mobile communication device between a first mode of functioning in which the transmitter is enabled, and a second mode of functioning in which the transmitter is disabled;
    an earphone jack into which the detachable earphone set is capable of being inserted to enable the second mode; and
    a controller arranged to ensure that the second mode will be continued for as long as the detachable earphone set is inserted into the earphone jack and that the first mode cannot be performed as long as the detachable earphone set is inserted into the earphone jack.

7. The combination according to claim 6, wherein the detachable earphone set is of a standardized appearance which indicates an exclusive use of the second mode.

8. The combination according to claim 7, wherein the detachable earphone set is of a standardized appearance in color which indicates an exclusive use of the second mode.

9. The combination according to claim 6, wherein the detachable earphone set is provided with a standardized symbol marked on an appearance thereof which indicates an exclusive use of the second mode.

10. The combination according to claim 6, wherein the detachable earphone set is of a specialized type for exclusive use in the second mode, and wherein the controller of the mobile communication device includes a sensor arranged to sense that the earphone set of the specialized type is inserted into the earphone jack.

11. The combination according to claim 10, wherein the controller is arranged to allow the first mode to be selected when another type of earphone set is inserted into the earphone jack if the sensor does not sense that the inserted earphone set is of the specialized type.

12. An earphone set to be attached to a mobile communication device having a transmitter arranged to generate radio waves used in a telecommunication function, a selector arranged to selectively switch the mobile communication device between a first mode of functioning in which the transmitter is enabled, and a second mode of functioning in which the transmitter is disabled, and an earphone jack for the earphone set to enable the second mode, the earphone set comprising:
    a special plug to be inserted into the earphone jack, the special plug being for exclusive use in the second mode; and
    a specialized appearance to indicate that the earphone set is of exclusive use of the second mode; wherein
    the second mode will be continued for as long as the special plug of the earphone set is inserted into the earphone jack and the first mode cannot be performed as long as the detachable earphone set is inserted into the earphone jack.

13. The earphone set according to claim 12, wherein the earphone set is of a standardized appearance in color which indicates an exclusive use of the second mode.

14. The combination according to claim 12, wherein the earphone set is provided with a standardized symbol marked on an appearance thereof which indicates an exclusive use of the second mode.

* * * * *